Sept. 22, 1925.
F. H. SCHOETTLER
1,554,298
WHEEL FOR BALL BEARING SKATES
Filed Sept. 22, 1924
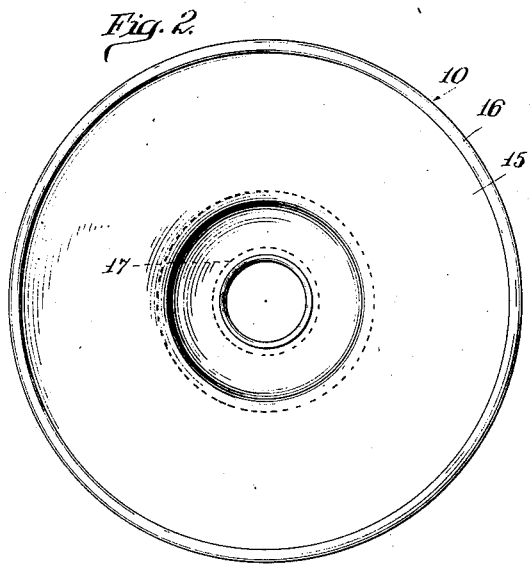
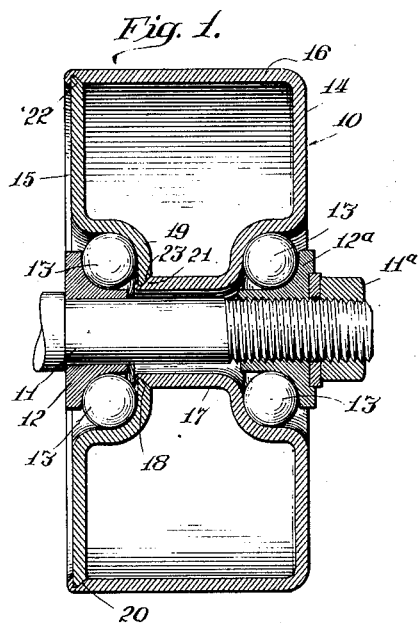
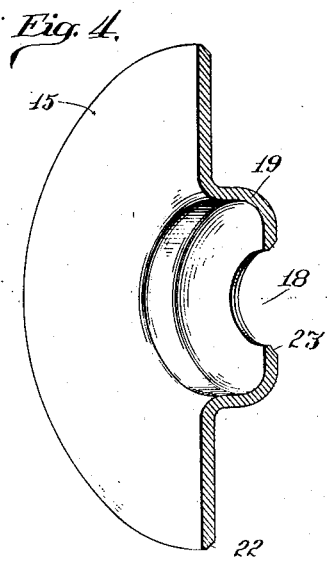
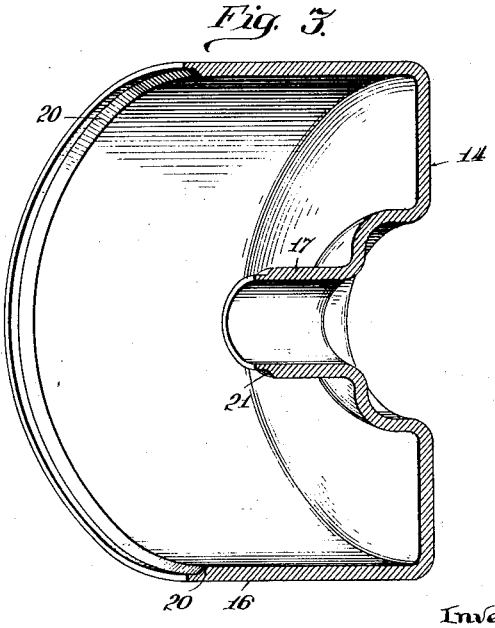
Inventor
Frederick H. Schoettler
By Barrett H. Truman
Attorneys Patented Sept. 22, 1925.

1,554,298

UNITED STATES PATENT OFFICE.

FREDERICK H. SCHOETTLER, OF CHICAGO, ILLINOIS, ASSIGNOR TO RICHARDSON BALL BEARING SKATE COMPANY, OF CHICAGO, ILLINOIS, A CORPORATION OF ILLINOIS.

WHEEL FOR BALL-BEARING SKATES.

Application filed September 22, 1924. Serial No. 739,093.

*To all whom it may concern:*

Be it known that I, FREDERICK H. SCHOETTLER, a citizen of the United States, residing at Chicago, in the county of Cook and State of Illinois, have invented certain new and useful Improvements in Wheels for Ball-Bearing Skates, of which the following is a specification.

My invention relates to wheels for ball bearing skates and has for its object the provision of a wheel of inexpensive construction, which will be strong and durable and which is so formed as to facilitate the assembling of its parts and insure accurate centering of the wheel on the shaft and its ball bearing races.

The invention has for further objects a new and improved construction relating to wheels of the above character, as will be hereinafter described and claimed, for carrying out the above stated objects and such other incidental objects as will appear from the following description of my invention.

The invention is illustrated in a preferred embodiment in the accompanying drawing, wherein like characters of reference indicate like parts, and wherein Fig. 1 is a vertical cross section through a skate wheel constructed in accordance with my invention, a portion of the skate truck shaft and the ball bearings being shown to illustrate the arrangement of the parts in their assembled relation.

Fig. 2 is a side view of the construction shown in Fig. 1.

Fig. 3 is a sectional perspective of the shell portion of the wheel, and

Fig. 4 is a sectional perspective of a wheel side plate of my preferred construction.

Referring to the drawing, 10 designates a skate wheel constructed in accordance with my invention, 11 the axle on which the wheel operates, 12—12ª inner and outer ball races, secured to the axle, 13 a plurality of anti-friction balls interposed between the ball races 12—12ª and suitable ball race portions of the wheel, and 11ª is a nut threaded on the axle to hold the above-mentioned members in their proper position.

The wheel is preferably made of pressed metal and consists of a shell 14 and a side plate 15 so secured together as to rigidify the shell portion and insure accurate alignment of the plate with said shell. The shell portion 14 of the wheel is formed with an integral tread 16 and with an integral, inwardly projecting, hub portion 17. The hub portion is formed adjacent the side face of the wheel with a cup or ball race to receive the anti-friction balls 13. The side plate 15 is provided with a central opening 18 and with an integral ball cup portion 19. In order to insure accurate centering of the side plate and shell members, the edges of the tread and hub portion of the shell are reduced in thickness and provided with tapered shoulders 20—21 which provide seats for correspondingly tapered edges 22—23 of the side plate.

After the side plate is placed in its proper position, as indicated in Fig. 1, the edges of the tread and hub portions of the wheel are spun over the edges of the side plate to provide rigid connection of the shell and side plate at the periphery and hub portions of the wheel.

While I have described my invention in connection with a preferred construction, it is to be understood that I do not limit myself to the exact construction herein shown and described, except in so far as the appended claims are expressly limited.

I claim:

1. A roller skate wheel comprising two pressed metal members, one of which is formed with a centrally disposed tubular portion providing a hub and the other of which is rigidly secured to the said hub portion and to the periphery of the first mentioned member.

2. A roller skate wheel comprising two pressed metal members, one of which is formed with a centrally disposed tubular portion adapted to be rigidly secured to the central portion of the other member, both of said members being formed at their peripheries with coengaging surfaces and secured together at that point.

3. A roller skate wheel comprising a member formed with an integral tread portion and with an integral hub portion, and a side plate member secured to said tread portion and to said hub.

4. A roller skate wheel comprising a member formed with an integral tread portion and with an integral hub portion, and a side plate member secured to said tread portion and to said hub; each of said members being formed adjacent the hub portion of the wheel with inwardly pressed cups to receive anti-friction members.

5. A roller skate wheel comprising a pressed metal member formed with a flange providing the tread portion of the wheel and formed with an inwardly extending hub portion provided with a cup to receive one set of anti-friction balls, and a side plate formed with an inwardly pressed cup portion to receive another set of anti-friction balls; each of said members being provided with co-engaging tapered surfaces adjacent the periphery and hub portion of the wheel to facilitate the centering of said members, and said members being secured together at the periphery and adjacent the hub of the wheel by beading the edges of said flange and hub over the outer and inner edges of said side plate.

FREDERICK H. SCHOETTLER.